(12) United States Patent
Crettenand et al.

(10) Patent No.: US 11,753,730 B2
(45) Date of Patent: Sep. 12, 2023

(54) LEUCODYE (SUCH AS LEUCOINDIGO) AS DISPERSING AID

(71) Applicant: Sedo Engineering SA, Riddes (CH)

(72) Inventors: David Crettenand, Riddes (CH); Grégoire Chappot, Savièse (CH); Ludovic Chappot, Charrat (CH); Herbert Gübeli, Goldingen (CH)

(73) Assignee: Sedo Engineering SA, Riddes (CH)

( * ) Notice: Subject to any disclaimer, the term of this patent is extended or adjusted under 35 U.S.C. 154(b) by 0 days.

(21) Appl. No.: 17/296,737

(22) PCT Filed: Nov. 29, 2019

(86) PCT No.: PCT/EP2019/083136
§ 371 (c)(1),
(2) Date: May 25, 2021

(87) PCT Pub. No.: WO2020/109577
PCT Pub. Date: Jun. 4, 2020

(65) Prior Publication Data
US 2022/0033980 A1 Feb. 3, 2022

(30) Foreign Application Priority Data
Nov. 30, 2018 (CH) .................................. 01480/18

(51) Int. Cl.
| | | |
|---|---|---|
| C25B 3/25 | (2021.01) | |
| C25B 15/021 | (2021.01) | |
| C25B 9/40 | (2021.01) | |
| C09B 7/00 | (2006.01) | |
| C09B 67/22 | (2006.01) | |

(Continued)

(52) U.S. Cl.
CPC .................. *C25B 3/25* (2021.01); *C09B 7/00* (2013.01); *C09B 67/0033* (2013.01); *C09B 67/0078* (2013.01); *C09B 67/0084* (2013.01); *C25B 9/40* (2021.01); *C25B 15/021* (2021.01);
(Continued)

(58) Field of Classification Search
None
See application file for complete search history.

(56) References Cited

U.S. PATENT DOCUMENTS 3,701,719 A 10/1972 Leduc et al.
3,966,571 A 6/1976 Gagnon et al.
(Continued)

FOREIGN PATENT DOCUMENTS

CN 103255642 A 7/2015
CN 105603453 A 5/2016
(Continued)

OTHER PUBLICATIONS

Bechtold et al, Reduction of Dispersed Indigo Dye by Indirect Electrolysis, Angewandte Chemie, vol. 31, No. 8, Aug. 1992, pp. 1068-1069 (Year: 1992).*

(Continued)

*Primary Examiner* — Harry D Wilkins, III
(74) *Attorney, Agent, or Firm* — Renner, Otto, Boisselle & Sklar, LLP (57) ABSTRACT

An electrolytic dye reduction method comprises preparing a catholyte by dispersing a dye in a leucodye comprising electrolyte. In a preferred method the leucodye like leucoindigo is the sole dispersing aid.

15 Claims, 7 Drawing Sheets

(51) Int. Cl.
*C09B 67/30* (2006.01)
*C09B 67/46* (2006.01)
*D06P 1/22* (2006.01)
*D06P 5/20* (2006.01)

(52) U.S. Cl.
CPC .............. *D06P 1/221* (2013.01); *D06P 1/228* (2013.01); *D06P 5/2016* (2013.01)

(56) References Cited

U.S. PATENT DOCUMENTS

| | | |
|---|---|---|
| 5,244,549 A | 9/1993 | Bechtold |
| 5,586,992 A | 12/1996 | Schnitzer et al. |
| 5,922,087 A | 7/1999 | Nishioka et al. |
| 6,627,063 B1 | 9/2003 | Marte et al. |
| 2003/0098246 A1 | 5/2003 | Merk et al. |
| 2004/0069653 A1 | 4/2004 | Merk et al. |
| 2005/0121336 A1 | 6/2005 | Marte et al. |
| 2009/0308757 A1 | 12/2009 | Crettenand |
| 2015/0298998 A1 | 10/2015 | Legzdins |
| 2018/0023202 A1 | 1/2018 | Krause et al. |

FOREIGN PATENT DOCUMENTS

| | | |
|---|---|---|
| DE | 102015202117 | 8/2016 |
| EP | 1297200 | 1/2007 |
| EP | 0760805 | 1/2008 |
| GB | 1239983 | 7/1971 |
| JP | H10 130876 | 5/1998 |
| WO | 1990/015182 | 12/1990 |
| WO | 1994/023114 | 10/1994 |
| WO | 2000/031334 | 6/2000 |
| WO | 2001/046497 | 6/2001 |
| WO | 2007/147283 | 12/2007 |
| WO | 2020/109583 A1 | 6/2020 |
| WO | 2020/109595 A1 | 6/2020 |

OTHER PUBLICATIONS

Roessler et al, Electrocatalytic Hydrogenation of Indigo: Process Optimization and Scale-Up in a Flow Cell, Journal of the Electrochemical Society, vol. 150, No. 1, Nov. 2002, pp. D1-D5 (Year: 2002).*

Roessler et al., "Electrochemical reduction of indigo in fixed and fluidized beds of graphite granules", Journal of Applied Electrochemistry 33:901-908, 2003.

Written Opinion and International Search Report for corresponding application PCT/EP2019/083136, dated Mar. 4, 2020.

* cited by examiner

LEUCODYE (SUCH AS LEUCOINDIGO) AS DISPERSING AID

This application is a national phase of International Application No. PCT/EP2019/083136 filed Nov. 29, 2019 and published in the English language, which claims priority to Switzerland Application No. 01480/18 filed on Nov. 30, 2018, the entire disclosures of which are hereby incorporated by reference.

TECHNICAL FIELD

The present invention belongs to dyeing with sulphur or vat dyes like indigo, in particular to an electrolytic dye reduction process.

BACKGROUND ART

Dyeing with sulfur or vat dyes has a long history. While electrochemical dyeing is still the most used method, due to the chemicals used its environmental impact is significant. Therefore, many attempts have been made to establish an electrolytic reduction method for the production of leucodyes, in particular leucoindigo. An electrolytic reactor suitable for electrolytic leucodye production is e.g. described in WO 2007/147283. One problem with electrolytic reduction is the insolubility of the dye in aqueous electrolytes like caustic soda solution that is e.g. preferred in indigo reduction. For good electrolysis, the dye has to be finely and homogeneously divided within the electrolyte. This is e.g. achieved by adding anionic dispersing agents e.g. anionic dispersing agents based on methylated naphthalene sulphonic acid-formaldehyde condensates. Since these agents either remain in the electrolyte or—worse—on the dyed fabric, so that at least part of them might leave the production plant and pollute the environment, a reduction method free of chemical adjuvants is much desired.

DISCLOSURE OF THE INVENTION

Hence, it is a general object of the invention to provide an electrolytic dye reduction method that works without the addition of any chemical adjuvants like reduction agents or dispersants or dispersing agents, respectively.

Now, in order to implement these and still further objects of the invention, which will become more readily apparent as the description proceeds, the electrolytic dye reduction method is manifested by the features that it comprises preparing a catholyte by dispersing a dye in a leucodye comprising electrolyte.

In the following description some terms are used the meaning of which is further defined below:

The term "suspension" in combinations such as diluted suspension, leucodye comprising suspension also means a catholyte, provided that the suspension is disclosed as being forwarded to an electrolytic cell. The finally reduced product is also termed leucodye solution.

The term "basic electrolyte" does not necessarily mean that it has a basic pH, i.e. pH>7, but that it is freshly supplied, i.e. dye-free, electrolyte solution. In general, however it is preferred that the basic electrolyte has basic pH.

The term "pipe" as used herein encompasses all hollow cylinder like means, i.e. not only rigid pipes but also flexible tubes.

In the scope of this invention it has surprisingly been found that leucodyes such as leucoindigo have a suspending effect for the dye like indigo. For environmental and health reasons it is therefore desired to perform the dyeing without any additional chemicals like dispersing agents.

In a preferred embodiment of the present invention the leucodye is the reduced dye, i.e. no mixing of dyes takes place although for specific effects such mixing is not excluded.

In a much preferred embodiment the dye is indigo and the leucodye is leucoindigo.

In general and in particular for indigo it has been found that a leucodye solution in basic electrolyte with a leucodye concentration of only 5% weight per volume (w/v) is able to stably suspend up to 20% w/v of dye, such as from 5 to 10% w/v leucodye for 10 to 20% w/v dye.

If no other dispersing agent than leucodye shall be used, which is much preferred, the problem is the first start of an electrolytic reactor if no suitable leucodye solution is available (e.g. from another plant). This problem has been solved by a starting method comprising (i) preparing a diluted leucodye suspension by dispersing a starting amount of dye in electrolyte and electrolytically reducing it to obtain a diluted leucodye solution, (ii) adding additional dye to the diluted leucodye solution of step (i) and electrolytically reducing it to obtained a more concentrated or a concentrated leucodye solution, (iii) optionally repeating step (ii) until the desired concentration of leucodye is obtained.

In more detail the method comprises the steps:

(i) a diluted suspension of dye in basic electrolyte is prepared in the main vessel or in the first and the main vessel by circulating and heating the suspension, optionally by improving the suspension by circulating it through one or more ultrasound apparatuses, (ii) the diluted suspension of step (i) is electrolytically treated in at least one electrolytic cell to obtain a diluted leucodye solution, (iii) the diluted leucodye solution of step (ii) can optionally be forwarded into the first vessel or the main vessel and there supplied with further dye to obtain a leucodye comprising suspension by circulating and heating, (iv) the leucodye comprising suspension of step (iii) is then circulated through the at least one electrolytic cell for electrochemical conversion of the dye to the leucodye or the leucodye comprising suspension to a leucodye comprising solution, respectively, optionally (v) repeating steps (iii) and (iv) one or n more times with the solution obtained in step (iv) and further dye to form a leucodye solution in basic electrolyte.

Steps (iii) to (v) are optional, i.e. they are only performed if the leucodye concentration obtained in step (ii) is not sufficiently concentrated to provide suitable dispersing effect.

For indigo as a preferred example, the dye suspension in step (i) has a concentration of 100 to 200 g/l in basic electrolyte, e.g. sodium hydroxide of a concentration of 2 to 10% w/v, preferably 4% w/v. The indigo suspension in a first step (iii) has a concentration of indigo and leucoindigo of 150 to 250 g/l, in a second step (iii) of 250 to 350 g/l and in a third step (iii) of 300 to 380 g/l.

Once the desired leucodye concentration in electrolyte is available, the electrolytic dye reduction method is performed in that concentrated leucodye solution is diluted with electrolyte and supplemented with dye, optionally and preferably circulated, preferably m through at least one ultrasound apparatus to improve the homogeneity of the suspension, and then forwarded to an electrolytic cell for electrolytic reduction, optionally repeating this step until the desired amount of leucodye solution with desired leucodye concentration is obtained.

Since the leucodye comprising solution used as dispersing medium at the beginning of the leucodye production usually stems from a former production cycle it has to be diluted in order to obtain a new batch. Thus, the amount of dye that can be suspended is limited. Therefore, the dye may be added in parts like first 150 kg that are then treated as indicated above to obtain a suitable catholyte, then reduced and then supplemented with further dye and optionally with further electrolyte in the main vessel or in the first vessel until the desired amount of leucodye solution of desired concentration is obtained.

In more detail the method for producing a concentrated leucodye solution comprises:

(i) adding a first part of a dye to be reacted to a leucodye comprising basic electrolyte solution in the first vessel or in the main vessel and circulating, optionally through one or more ultrasound apparatuses and preferably heating to form a first catholyte, (ii) forwarding the first catholyte of step (i), preferably via a filter for removing oversized particles and optionally a heating means, into the electrolytic cells and (iii) starting the electrolytic cells by stepwise enhancing the voltage to conversion voltage and maximum conversion power, (iv) adding a further part of dye to be reacted thereby enhancing the power, preferably to maximum power and continuing conversion, (v) optionally repeating step (iv) until desired concentration of the leucodye is achieved, (vi) converting the dye to leucodye until the power diminishes to a threshold conversion power due to dye conversion, (vii) removing the leucodye solution.

The addition of further dye can be performed by adding solid dye into the main vessel or—preferred—by feeding part of the leucodye comprising solution or suspension from the main vessel or the catholyte circulation loop into the first vessel where it can be and usually is diluted with basic electrolyte and supplemented with solid dye and circulated for forming a suitably homogeneous suspension that is then fed to the main vessel.

In general and in particular for indigo it has been found that a leucodye solution in basic electrolyte with a leucodye concentration of only 5% w/v is able to stably suspend up to 20% w/v of dye, such as from 5 to 10% w/v leucodye for 10 to 20% w/v dye.

For producing a concentrated leucoindigo solution, e.g. a solution comprising 300 kg indigo in 1000 to 1500 l basic electrolyte, the following procedure has proved to be very suitable:

For starting, part of the leucoindigo solution is left in the main vessel or pumped into the first vessel for being supplemented with basic electrolyte and indigo. It has been proved suitable to retain about 200 l leucoindigo solution in the vessel that is then supplemented with 300 to 600 l of basic electrolyte. Due to further leucoindigo solution in the pipes and electrolytic cells etc. the leucoindigo concentration is enhanced as soon as mixed with the content of the pipes, cells etc. Thus, although a 5% leucoindigo concentration is enough for stabilizing a suspension with up to 20% of indigo, in general higher leucoindigo concentrations are used. Volume information given below refers to the volume in the first and the main vessel.

A first part, e.g. 150 kg, of indigo to be reacted to leucoindigo is added to 500 l of a leucoindigo comprising basic electrolyte solution (preferably leucoindigo concentration 15% to 20%, NaOH concentration 2% to 10%, in particular about 4%) in the first vessel or—if no first vessel is present—in the main vessel and circulated, optionally through one or more ultrasound apparatus, and heated to form a first indigo suspension. If a first vessel is present, the suspension is circulated through the first vessel and an ultrasound apparatus for about 30 min. Once pumped into the main vessel it is again circulated for about 20 min. through a second ultrasound apparatus and—at least when ready for supply to the cathode—through a particle filter and a heat exchanger.

Once the suspension is homogeneous (indigo particle size under 50 μm) and has the desired temperature of about 50° C. to 65° C., preferably 60° C., the first indigo suspension is forwarded into at least one electrolytic cell (in industrial applications in general several electrolytic cells in more than one stack and all cells of all working stacks in parallel) and the electrolytic cells—in a preferred embodiment all stacks—are then started by stepwise enhancing the voltage to conversion voltage and maximum conversion power, e.g. from 7 volt to 11 volt in steps of 0.5 volt about every two minutes. All cells of one stack and preferably also all stacks are simultaneously fed and started. The preparation of step (i) takes about 1 to 2 hours, starting the electrochemical process about 15 min.

At the maximum conversion voltage of 11 volt, the conversion power is about 170 A for an indigo suspension comprising 150 kg indigo in 500 to 800 l leucoindigo catholyte. As soon as the maximum current is reached, further indigo, e.g. 50 kg in leucoindigo solution, is prepared in the first vessel and supplied to the main vessel resulting in again enhanced current and the reduction is continued. The leucoindigo solution used for suspending the indigo in general is diluted with electrolyte to a leucoindigo concentration of 5 to 20%, more preferred 10 to 20% weight per volume (w/v).

Once all the indigo has been added, e.g. 3 times 50 kg in about 150 to 400 l to a total of 300 kg in 1000 to 1500 l electrolyte, the power diminishes with the decreasing indigo concentration. Since no further indigo shall be supplied, the voltage is also slowly reduced dependent on the measured power or dependent of the indigo concentration, respectively. In general, by this method, all dye can been reduced to leucodye.

Since the quality of the dye suspension is also dependent on the particle size, it is preferred that the suspension is circulated, preferably through at least one ultrasound apparatus, preferably until about 95% weight per weight (w/w) of the particles are smaller than 50 μm, more preferred at least 97% w/w and most preferred about 99% w/w, i.e. the particles are not individualized but the percentage is determined by weighing the residue in a respective particle filter.

The dye suspension or catholyte preparation can be performed directly in a main vessel or first in a first vessel and then supplied to a main vessel. In the case of a first vessel, circulation can be performed in the first vessel and/or in the main vessel. Once the desired quality of the suspension has been reached, i.e. the suspension is ready for being used as catholyte, the suspension is forwarded to the electrolytic cell, in particular to a cathode compartment comprising a particulate carbon cathode like a graphite cathode.

Since in general it is not possible to remove all oversized particles by circulating even in presence of an ultrasound apparatus, it is preferred that the catholyte supply pipe comprises a particle filter upstream of the inlet into the cathode compartment. In another preferred embodiment either this catholyte supply pipe or the dye suspension circulation pipe of the main vessel comprise a heating means like a heat exchanger.

It has been found that due to an osmotic pressure difference between cathode compartment and anode compartment impurities that are e.g. present in the dye, in the case of indigo e.g. aniline, migrate through the semipermeable membrane where they might form an insoluble film on the anode thereby affecting its performance and lifetime. It has now been found that the performance and lifetime of the anode can be significantly improved if the anolyte circulation pipe is equipped with an adsorption filter for adsorbing such impurities. Since in the method of the present invention no additional dispersants or other chemical aids are needed, there is no risk that they are depleted due to the osmotic pressure difference that is upheld during the whole process due to the removal of the molecules on the anode side. Thus, no destabilization of the suspension due to dispersant removal in an early reduction stage is risked.

Another advantage is an easy regeneration of the electrolytic cells.

This can be performed by washing the electrode compartments, in particular the particulate electrode with strong acids (pK<1) by circulating the acidic cleaning solution through the electrode bed, followed by washing the bed with water, optionally and preferably after having washed the acid treated bed with a basic solution, preferably caustic soda, for more efficient acid and electrode contamination removal.

This washing step is particularly suitable for particulate carbon based electrodes, preferably cathodes, since it removes metals from the particle surface. Such metals can be present in the particles themselves or brought onto the particles during electrolysis. These metals, in general mainly iron and/or nickel and/or copper in metallic or ionic or complexed form, can have a catalytic effect on $H_2$-generation that competes the desired reduction and thus has to be avoided. However, the washing step has also proved to be very suitable for the cleaning of anodes.

The acid washing is performed for a suitable time, such as 10 to 60 min., followed by washing the bed with a base like caustic soda (to remove the acid and contamination of the electrode) followed by water washing or—less preferred—by washing with water directly. While the washing can be performed for both electrodes, i.e. the cathode and the anode simultaneously, in case of several stacks of electrolytic cells it is preferred to perform the cleaning/regeneration of the cathode and the anode in a subsequent manner, i.e. first the cathodes of all stacks, in a preferred embodiment one stack at a time and during suspension preparation, followed by cleaning of all anodes of preferably one stack. Since the anodes need less regeneration than the cathodes it proved advantageous to also clean them stackwise after the cleaning of all cathodes, i.e. the cathodes of each stack once a week, all anodes of one stack once all 7 weeks.

Cleaning the electrodes during suspension preparation has the advantage that all stacks remain in leucodye production, and since the preparation of a fresh suspension in the batch procedure takes at least 1 hour while longer, i.e. up to two hours, circulation through ultrasound apparatuses improves the suspension quality, there is almost the same time needed for careful cleaning/regeneration of the electrodes and suspension preparation. Thus, performing the two steps simultaneously does not or only minimally extend the time needed anyway.

At least the cleaning of the cathodes of one stack only at a time has several advantages, namely
the water needed for suspension preparation can be supplied via the cathodes of the stack to be regenerated thereby avoiding loss of leucodye,
the water needed for suspension preparation is sufficient to remove all leucodye from one stack but might be less efficient in the case of several stacks
since the cleaning solutions are recycled, less cleaning solutions are needed.

Suitable acidic solutions have a concentration in the range of 10 to 100 g/l, more preferred 40 to 60 g/l, most preferred about 50 g/l, or 0.25 to 30 M, preferably 1 to 2 M, more preferred 1.3 to 1.4 M (referred to the protons) in deionized water. If a basic solution, in particular one with a base with a $pK_a$>10, like caustic soda, is used following the acid solution cleaning, the concentration in general is in the range of 10 to 100 g/l, more preferred 20 to 60 g/l, most preferred 40 g/l, or 0.1 to 2.5 M, preferably 0.5 to 1.5 M (referred to hydroxide) in deionized water.

For the washing step the strong acid is preferably selected from the group consisting of HCl, $H_2SO_4$, $HNO_3$ and mixtures thereof.

The washing solutions can be circulated through filters in order to retain small particles of metallic origin or abraded electrode material and through carbon or other adsorption filters to adsorb dissolved contaminants.

An electrolytic reactor suitable for performing the method of any of the preceding claims comprises a main vessel and a first vessel for preparing a dye suspension or a catholyte, respectively, an anolyte vessel and at least one electrolytic cell comprising a cathode compartment and an anode compartment separated by a separator. The main vessel is connected to the cathode compartment via catholyte circulation loop or catholyte circulation pipe for circulating a catholyte and said anolyte vessel is connected to said anode compartment via anolyte circulation loop or anolyte circulation pipe for circulating an anolyte. In addition, the main vessel and the first vessel are connected with each other via a leucodye return pipe and a first suspension supply pipe and the main vessel comprises a main suspension circulation loop and/or the first vessel comprises a first suspension circulation loop. The main suspension circulation loop and/or the first suspension circulation loop are preferably equipped with an ultrasound apparatus.

For industrial applications the electrolytic reactor comprises at least four electrolytic cells, wherein the electrolytic cells are provided in the form of at least two stacks of at least two electrolytic cells each, said stacks and said electrolytic cells of one stack are placed in parallel and allow the separation of at least one stack for washing/regeneration while leucodye is circulated through the remaining one or more stacks and/or the shutdown of at least one stack for maintenance while the remaining ones remain in the production and preferably can be operated such that they provide full production capacity.

In a much preferred embodiment of an electrolytic cell the cathode compartment comprises a multitude of freely suspended conductive, in particular non-spherical granules in contact with a conductor forming at least the side wall opposite to the separator, said cathode compartment being provided with an upper grid and a lower grid. The width of the mesh and the positioning of said grids is chosen such that the liquid catholyte can pass through them but the granules are prevented from passing through them so that they are retained in the cathode compartment. The anode compartment has a wall opposite to the separator formed by an electrode (the anode) and each compartment is provided with an inlet and an outlet at the top or the bottom of each compartment for the liquid catholyte or the liquid anolyte, respectively, wherein the flow of the liquid catholyte and/or the liquid anolyte can be adjusted.

A preferred number of stacks is at least 4, more preferred 6. In case of 6 stacks, each stack can be individually operated, i.e. one is separated for washing/regeneration while leucodye solution is circulated through the remaining 5 stacks. Or at least 1 and preferably 1 stack can be shut down for maintenance exceeding the mere washing/regeneration, while the remaining ones, in general 5, are working. Six stacks are preferred, since in a continuously producing reactor, e.g. a reactor producing one batch a day, it is usually sufficient to regenerate the cathodes once a week, while the anodes need less frequent regeneration, e.g. once all seven weeks. For a reactor with 6 stacks this means that the cathodes of all stacks are cleaned after six days, with the anodes of one stack being cleaned on the seventh day. Each stack preferably comprises from 1 to 10 electrolytic cells, preferably 4 to 6 electrolytic dells, in particular 5 electrolytic cells. For an electrochemical reactor suitable for producing 1000 kg of leucodye, in particular leucoindigo solutions of a concentration of e.g. 30% within 24 h, an electrochemical reactor with 6 stacks (at least 5 working) of 5 electrolytic cells each has proved suitable, in particular for electrolytic cells with a cathode compartment having the following dimensions and a particulate carbon cathode:

0.3 m² separator area per cell
Dimensions of the cathode compartment containing particulate graphite carbon are 0.4 m high, 0.7 m large and 0.04 m thick
Dimensions of the carbon granules are between 1 mm to 0.3 mm
Dimensions of the stainless steal cathode current collector and the anode are 0.6 m high and 0.9 m large Further information on a suitable electrode can be found in WO 2007/147283 A2 the disclosure of which is incorporated herein in its entirety. Such information regards e.g. the determination of the sphericity and the flow properties.

A problem with particulate electrodes in combination with suspensions is clogging, also resulting in reduced electrolyte transport through the particulate electrode and/or to enhanced pressure.

In order to avoid any clogging of the particulate electrode the electrolyte circuit direction, i.e. the electrolyte flow direction, preferably is regularly inverted, e.g. all 2 to 5 minutes such as about all 3 minutes. Since the electrolysis shall not be affected by the inversion of the flow direction it is important that the packing of the particulate bed of the electrode in both directions is the same. This is obtained by ensuring that the flow and the particulate bed are so that the bed is always tightly pressed against the upper grid or the lower grid retaining the particles within the electrode compartment.

Dependent on the kind of electrode the electrolyte direction of the particulate cathode and optionally also of the anode can be inverted.

The catholyte supply pipe is preferably equipped with a particle filter for removing oversized particles, in particular particles of >50 to 150 μm and/or a heating means (heat exchanger) for raising the temperature to e.g. about 50° C. to 65° C., preferably 60° C. for indigo. Optionally, the catholyte supply pipe can also be equipped with an ultrasound apparatus. In a much preferred embodiment, the main vessel also comprises a main suspension circulation loop equipped with a main suspension circulation pump and preferably also with an ultrasound apparatus. This main suspension circulation loop can be a separate loop or provided as a bypass to the catholyte supply pipe, i.e. leaving the main vessel at the catholyte outlet and being returned via the reduced catholyte inlet but not passing via the cathode compartment and only optionally via the heating means and in general not via the filter. A presently preferred ultrasound apparatus is a cylindrical ultrasound apparatus. The main suspension can be circulated through the circulation pipe for a time sufficient to generate a homogeneous dye suspension, the catholyte, having desired temperature and only few oversized particles. The time needed for obtaining a good suspension is about 1 hour, however, better results are achieved with a suspension that has been obtained after about 2 hours.

Since the aim of the present invention is to avoid chemicals like dispersing agents, preparing the suspension in a first vessel is much preferred since in a first vessel the suspension can be circulated to improve the suspension, in particular the particle sizes, without interrupting the circuit through the electrolytic cells as would be the case if circulation would be performed in the main vessel.

This first vessel comprises a first suspension circulation loop equipped with a first suspension circulation pump and preferably an ultrasound apparatus, more preferred a cylindrical ultrasound apparatus. The dye suspension in the first vessel is prepared by circulating it through the circulation loop for a time sufficient to generate a suspension of desired homogeneity, i.e. with dye particle sizes close to or below 50 μm. In case of a first vessel with an ultrasound apparatus in its circulation loop, it is possible to abstain from an ultrasound apparatus in the circulation loop of the main vessel or of a circulation loop of the main vessel at all, although their presence is preferred.

Since the presence of oxygen has to be avoided, the cathode part of the reactor is operated under inert gas atmosphere, in general nitrogen that can be supplied and removed at any place in the catholyte circuit provided that inert atmosphere is upheld over the whole circuit. A preferred place for nitrogen supply and removal (in general together with hydrogen generated during electrolysis) is at the top of the main vessel.

BRIEF DESCRIPTION OF THE DRAWINGS

The invention will be better understood and objects other than those set forth above will become apparent when consideration is given to the following detailed description thereof. This description makes reference to the annexed drawings, wherein.

MODES FOR CARRYING OUT THE INVENTION

The invention is now further described based on the Figures for a preferred dye reduction plant, in particular an indigo reduction plant.

Figure 1:
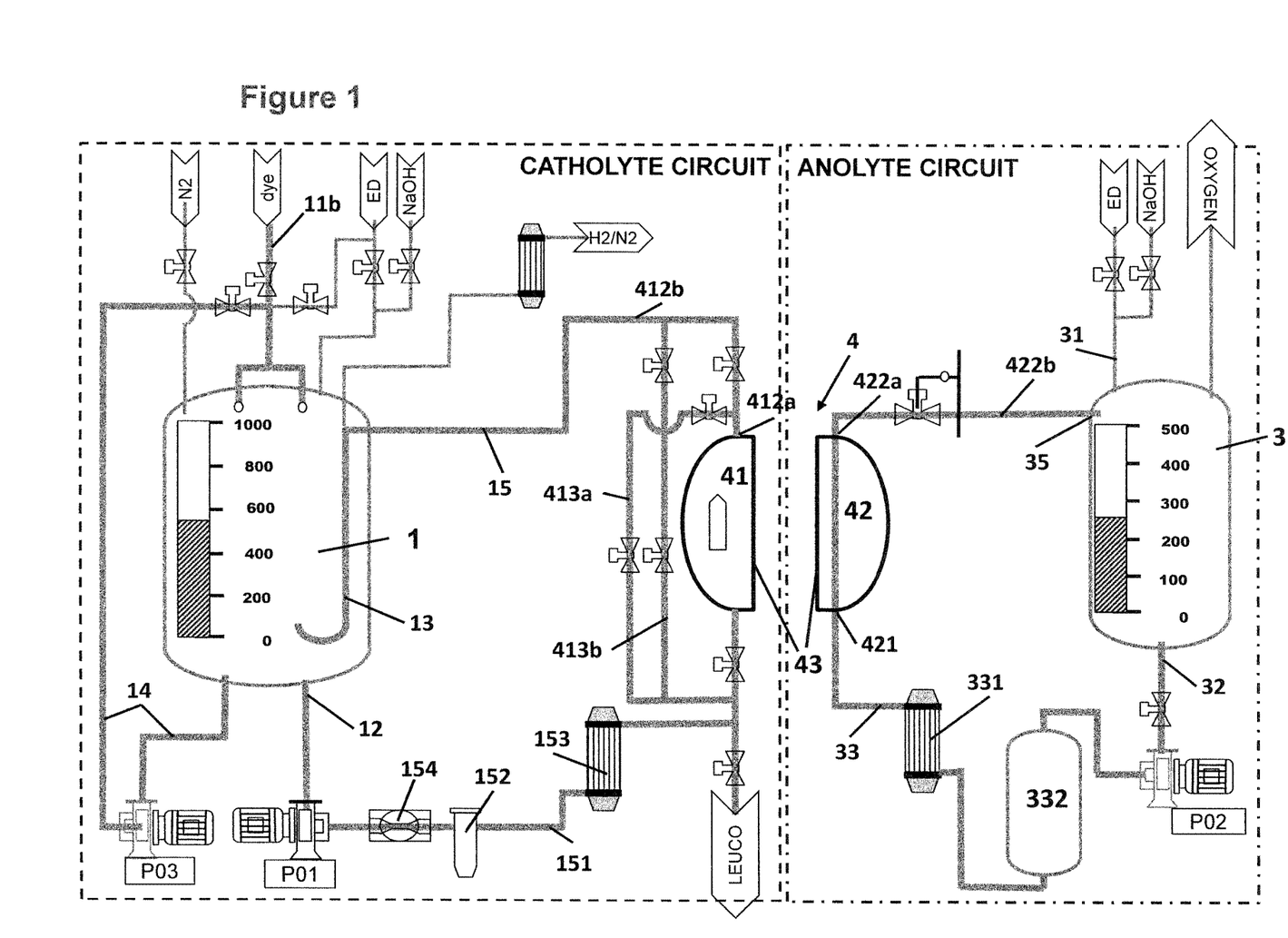
FIG. 1 shows the main parts of a whole electrochemical reactor with the electrolytic cell in exploded view.

FIG. 1 shows the core of a preferred electrolytic reactor for use in the present invention with only one electrolytic cell 4 for clarity reasons and with an inlet for dye in suspended form, i.e. transferred from a first vessel 2. An assembly of six stacks is shown schematically in FIG. 2a and one stack with five electrolytic cells is shown more detailed in FIG. 2b.

The main vessel 1 is provided with a main suspension circulation loop 14 comprising a main suspension circulation pump P03 and preferably an ultrasound apparatus 141 (see FIG. 4) for circulating the suspension thereby improving its homogeneity.

When the suspension has been circulated for some time (dependent on the quality of the dye, i.e. its particle size and particle distribution) the main suspension circulation loop 14 is closed and the valve to the catholyte outlet 12 is opened. The catholyte is then circulated through catholyte circulation loop 15 by pumping it by the catholyte pump P01 via catholyte supply pipe 151 through a further optional ultrasound apparatus 154, a particle filter 152 for removing oversized particles if still present and a catholyte heating means (heat exchanger) 153 via catholyte inlet 411 into the cathode compartment 41 of the electrolytic cell 4 separated from the anode compartment 42 by a separator 43, preferably a semipermeable membrane. After having passed the cathode, the catholyte is returned to the main vessel 1 via reduced catholyte outlet 412a, reduced catholyte return pipe 412b and reduced catholyte inlet 13. As indicated by reference numbers 413a and 413b, in a preferred embodiment the catholyte direction can be inverted.

An anolyte is supplied to anolyte vessel 3 via anolyte supply pipe 31 or—once the reduction has been started—anolyte inlet 35 and supplied to the anode compartment 42 via anolyte outlet 32, anolyte pump P02, anolyte heating means 331 and anolyte inlet 421. Having left the anode compartment 42 via anolyte outlet 422a, the anolyte is recirculated to anolyte vessel 3 via anolyte return pipe 422b and anolyte inlet 35.

In a preferred embodiment an adsorption filter 332 is provided within the anolyte circuit. This filter 332 can be placed anywhere, however it is preferably placed just before the anolyte heating means 331 since there the temperature is lowest and thus adsorption best.

All vessels are in addition provided with supply means for nitrogen, caustic soda and optionally further supply means as well as with degassing means and solution withdrawal lines for the withdrawal of the leuco dye or the anolyte in case of anode cleaning.

Figure 2A:
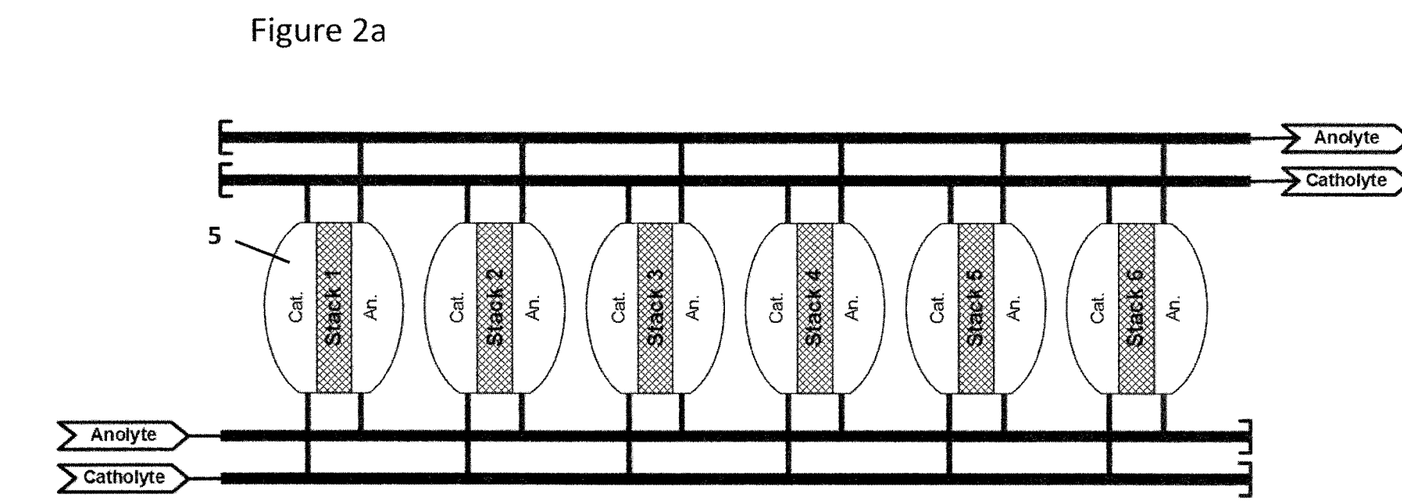
FIG. 2a shows schematically six stacks, each with the relevant supply and withdrawal lines
Figure 2B:
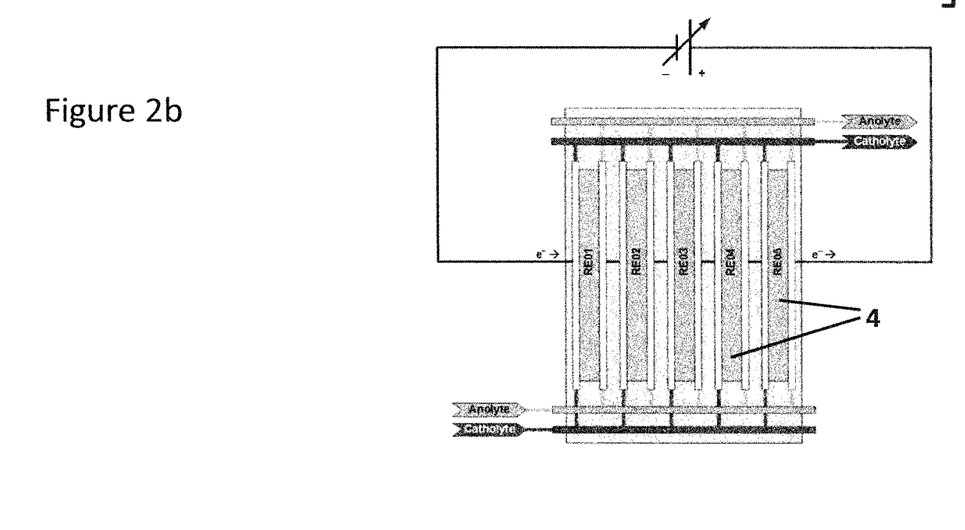
FIG. 2b shows one stack with five electrolytic cells more detailed.

FIG. 2 shows schematically 6 stacks of 5 electrolytic cells 4 each, all connected in parallel. Due to independent anolyte and catholyte supply to each of the stacks, any one thereof can be separated independently for regeneration or shut down for maintenance.

Figure 3:
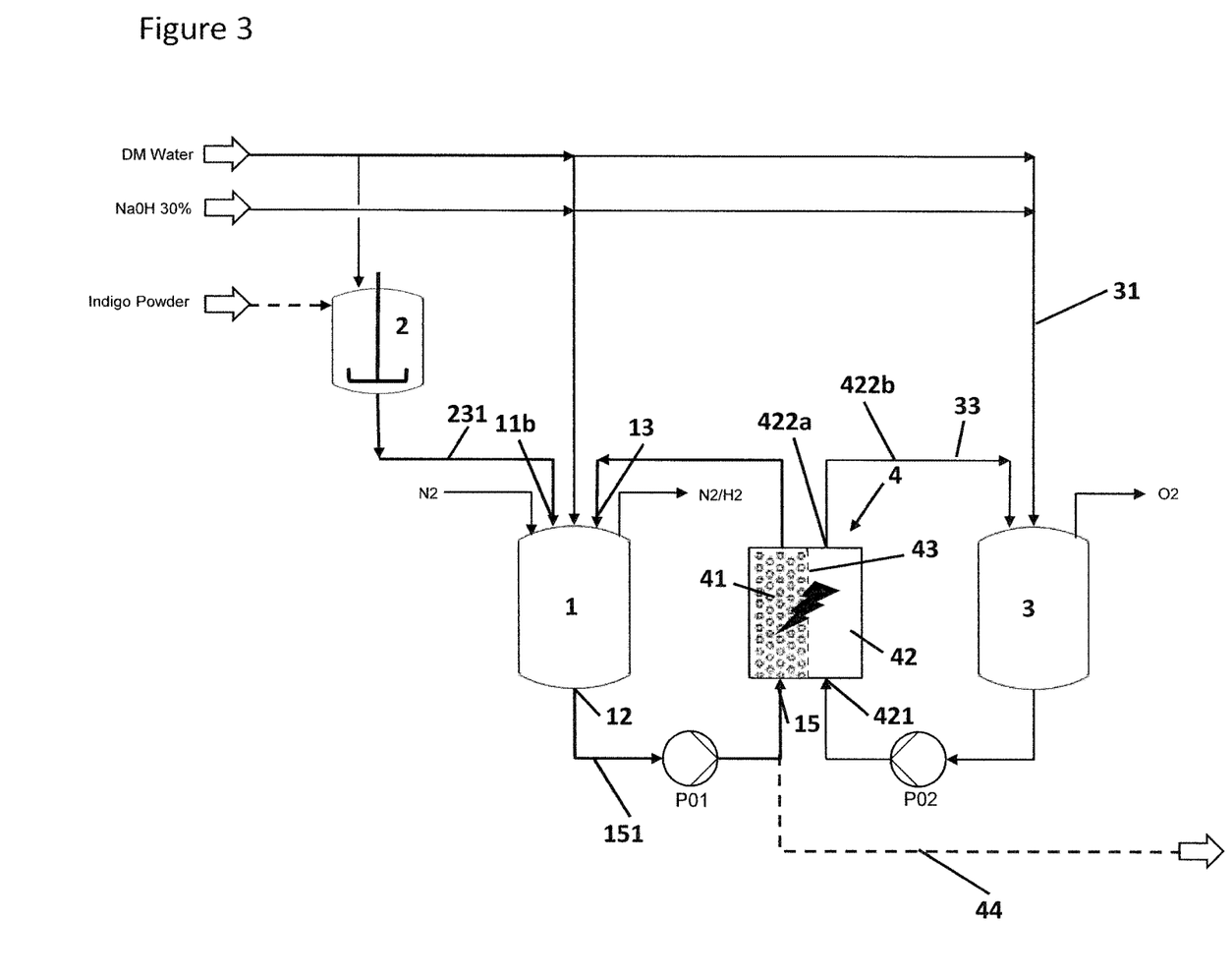
FIG. 3 schematically shows dye suspension preparation in the first vessel and supply to the main vessel.
Figure 4:
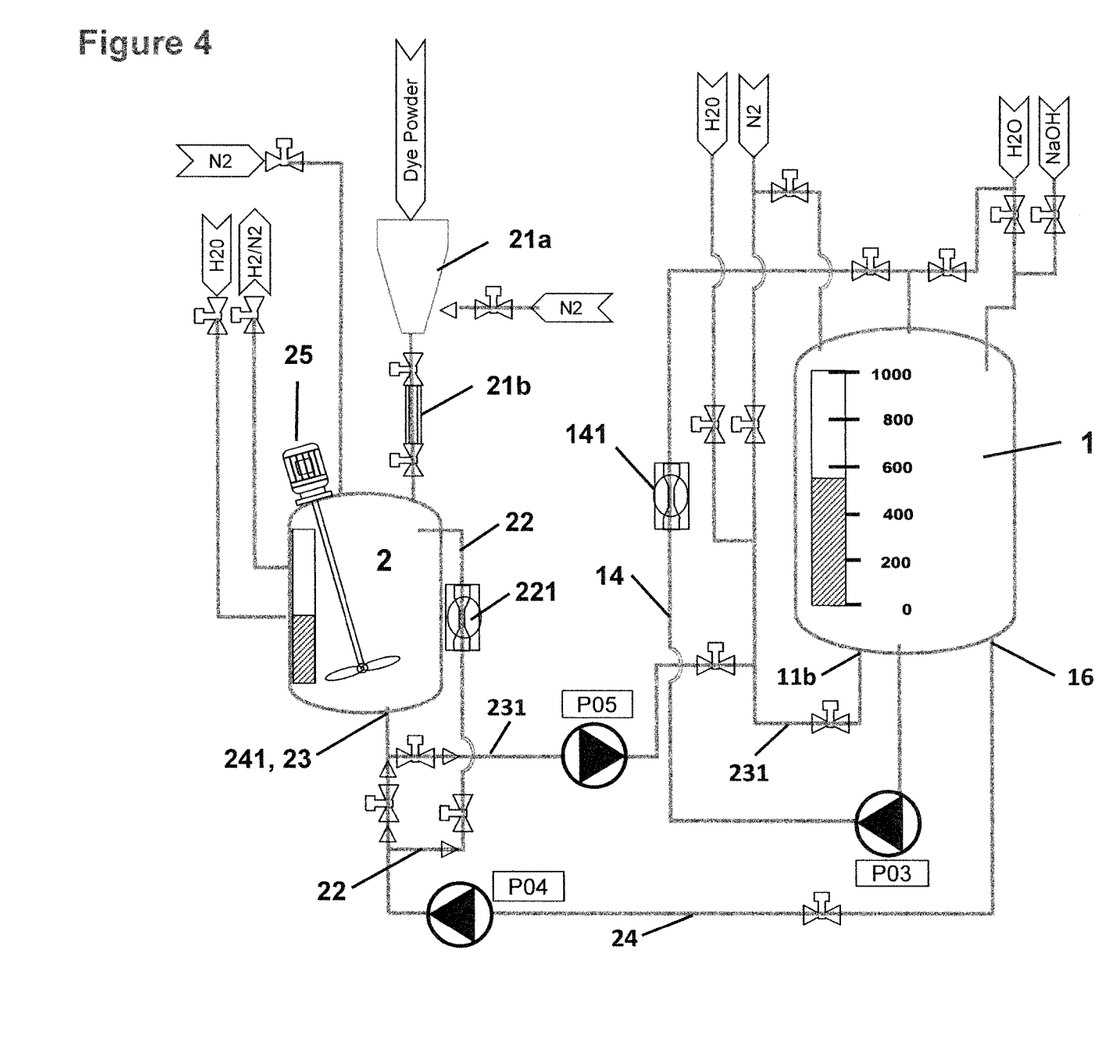
FIG. 4 shows in more detail the part of the electrolytic reactor that serves the catholyte preparation in the presence of a first vessel.

FIGS. 3 and 4 show preparation of a dye suspension in a first vessel 2. As best shown in FIG. 4, this preparation comprises supplying solid dye from solid dye vessel 21a via solid dye inlet 21b into a solution of caustic soda with desired concentration in first vessel 2. The first vessel can be provided with a first suspension circulation loop 22, optionally equipped with an ultrasound apparatus 221. Once the dye suspension has reached desired homogeneity it is supplied to the main vessel 1 via suspension outlet 23 and dye suspension inlet 11b, driven by pump P05. Once the suspension is in main vessel 1, it can be further circulated if desired or directly used as catholyte. The main vessel 1 and all pipes and apparatuses that are in contact with leucodye once the reduction process is started are purged with nitrogen (or other inert gas), e.g. introduced into main vessel 1, in order to prevent oxidation of the once reduced dye. After having been circulated as described with regard to FIG. 1 the thus formed catholyte is circulated via the cathode department, driven by pump P01, until all dye has been reduced to leucodye.

Figure 5:
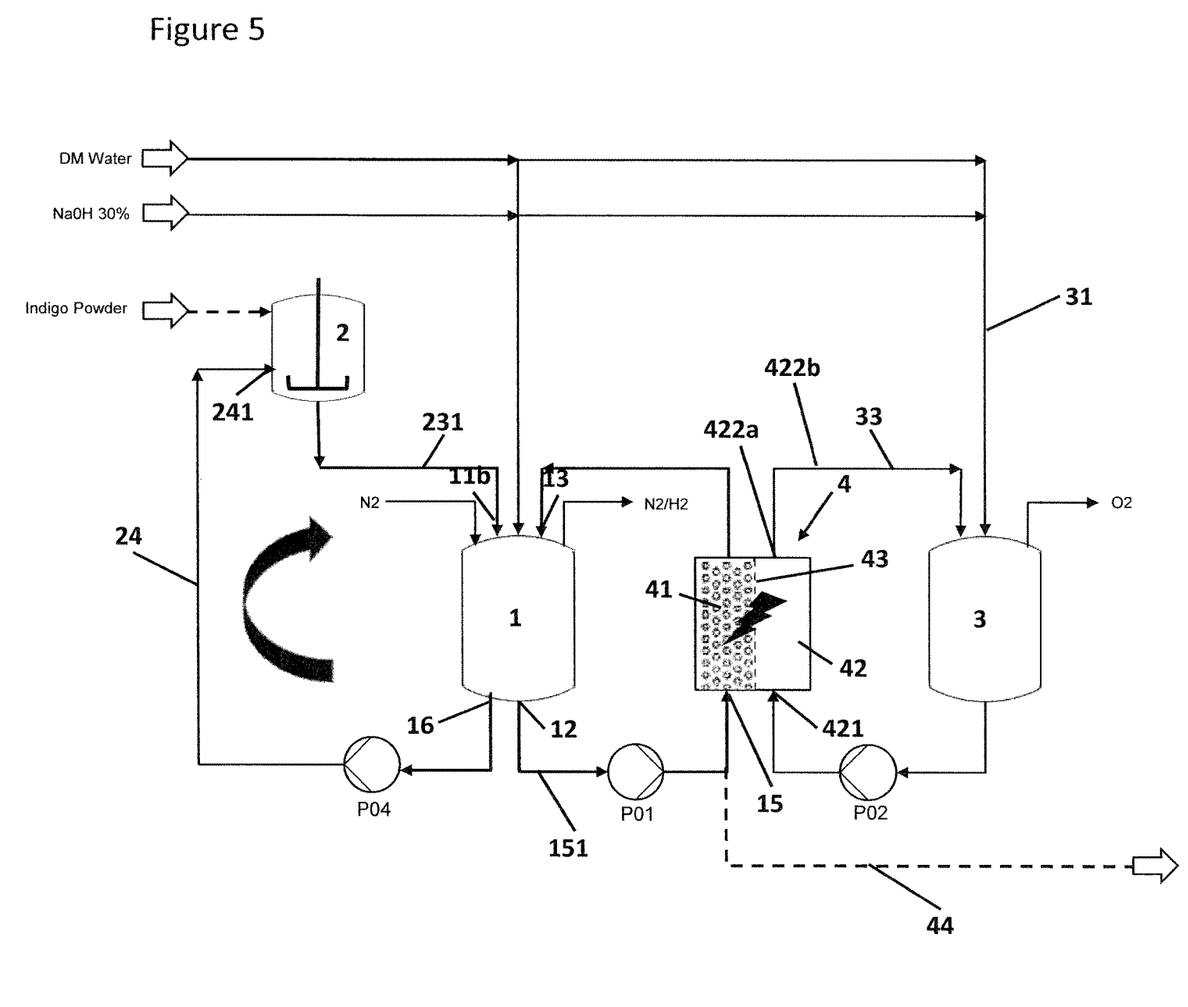
FIG. 5 shows the dye suspension preparation in the presence of a first vessel and with use of internally produced leucodye as dispersing agent.

As indicated above, most dyes cannot be suspended in the desired high amounts without the addition of substantial amounts of dispersing agent. A dye reduction method of the present invention that uses few and preferably no dispersing agent other than leucodye is schematically shown in FIG. 5.

In order to start a dye reduction, in a first preparatory step a diluted suspension is prepared as described above and subjected to electrolytic reduction in electrolytic cell 4. Once the dye has been reduced to leucodye, it can either be supplemented with further dye in the main vessel 1 or some of the leucodye produced can be transferred from the main vessel 1 via leucodye outlet 16, leucodye return pipe 24 equipped with leucodye return pump P04 and leucodye inlet 241 to the first vessel 2 for n being supplemented with further dye. The leucodye comprising suspension can then be first processed in the first suspension circulation loop 22 in order to improve its homogeneity before being fed to main vessel 1 and finally to the electrolytic cells as described above.

In a similar way, once the leucodye production has been started, part of the concentrated leucodye is removed and part of the leucodye solution is left in the reactor. This remaining leucodye solution can then be either left in the main vessel 1 or—preferably—fed to first vessel 2 as shown in FIG. 5 via leucodye return pipe 24. In the main vessel 1 or preferably in the first vessel 2 the leucodye solution is diluted with additional electrolyte such as caustic soda. Since the leucodye acts as dispersing agent, a higher concentrated dye suspension can be prepared directly. Nevertheless, it has proved advantageous to add the leucodye in several parts, indicated in FIG. 5 as semicircular arrow. In the case of leucoindigo it has been found that concentrations of 5 to 20% are suitable for stabilizing suspensions comprising indigo in amounts of up to 20%. Once the indigo has been reduced to leucoindigo in the desired concentration, the leucoindigo is removed from the reactor via concentrated leucodye outlet 44.

Figure 6:
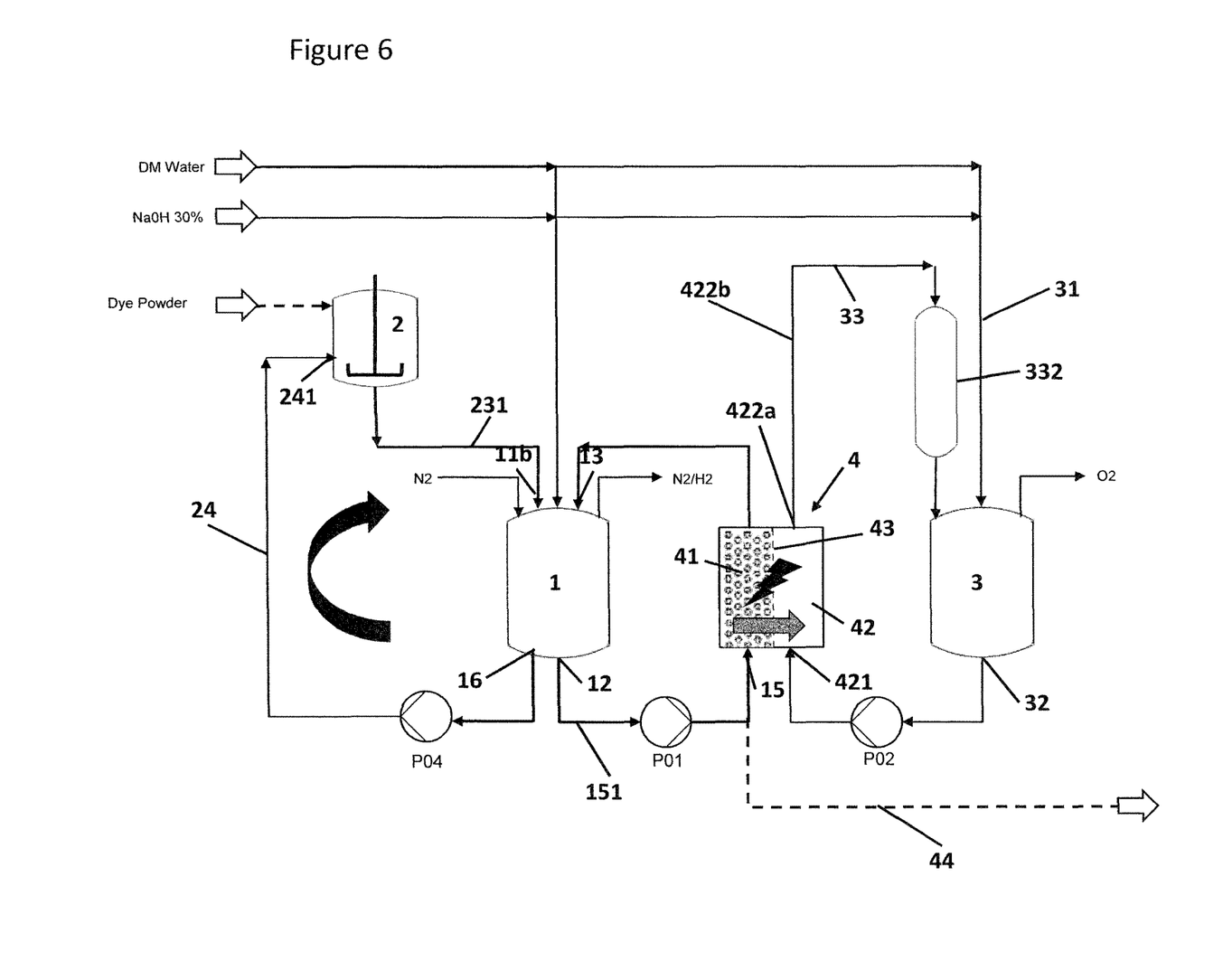
FIG. 6 shows the reactor and method with continuous cleaning of the anolyte with an adsorption filter.

As already indicated above and as shown in FIGS. 1 and 6, an adsorption filter 332 can be provided in the anolyte circulation loop 33. If the anolyte circulation loop 33 comprises a heating means 331, the adsorption filter 332 preferably is provided close to but upstream of the heating means 331 and the heating means 331 is preferably provided upstream of the anode compartment. This adsorption filter serves the removal of small molecules that may be present and in general are present in the dye and have been found to migrate through the separator 43, e.g. a semipermeable membrane, and directly or after reaction like polymerization deposit on the anode n thereby affecting its activity.

Suitable adsorption filter materials are e.g. activated carbon and molecular sieves like zeolites. For good anolyte flow through the adsorption filter particle sizes of about 1 to 3 mm, in particular about 2 mm are preferred.

In spite of all the improvements described in the scope of the present invention that result in a cleaner process and thus longer intervals between maintenance activities, sometimes cleaning is nevertheless necessary since the quality of the electrolytic cells declines with continued use. In order to avoid shut down of the whole reactor, several stacks of electrolytic cells are provided, preferably so many stacks that one of them at a time is not needed for full reactor capacity and can be separated for maintenance without affecting a possibly connected subsequent dyeing process.

However, it has also been found that the intervals between actual shut down for maintenance can be significantly extended by applying a cleaning/regeneration method as further described below.

Figure 7:
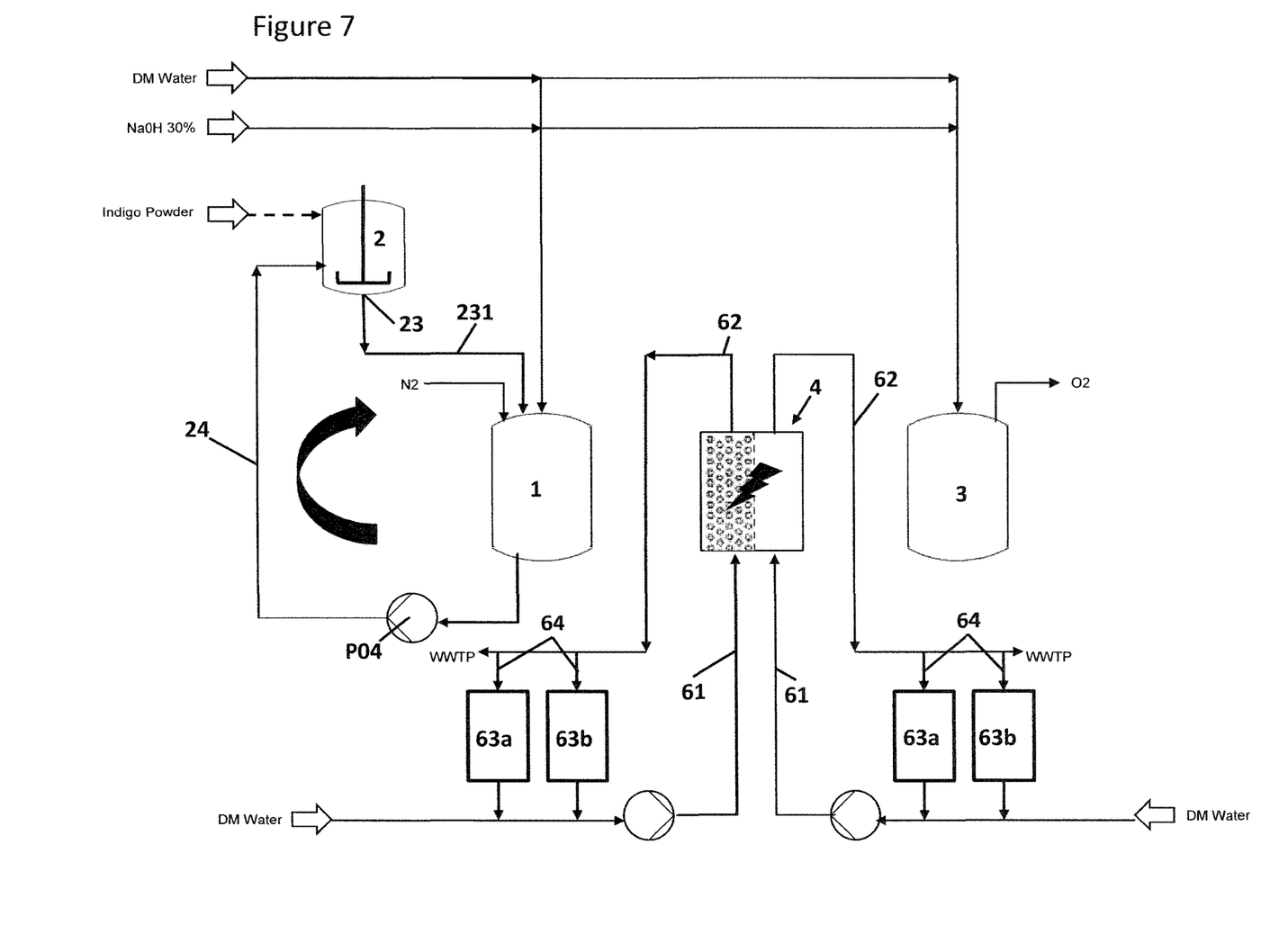
FIG. 7 shows the reactor and method of electrode regeneration by means of cathode and anode washing. The catholyte and anolyte circulation loop are omitted for clarity reason. There may but need not be circulation of anolyte during cathode washing but there preferably is circulation of catholyte during anode washing.

In performing such method at least one and preferably one stack is separated while leucodye solution is circulated through the remaining stacks. This stack that has been separated for cleaning can be cleaned or regenerated, respectively, as shown in FIG. 7.

While in particular the particulate cathodes, have to be regenerated, also the anode quality may suffer from use. Therefore, preferably also the anode compartments are cleaned. While cleaning/regeneration of cathodes and anodes can be done simultaneously with identical solutions, it is preferred to first clean the cathodes of all stacks, e.g. one by one, and then clean all anodes of one stack. This allows to adapt the cleaning/regeneration features like cleaning solutions and application time to the actual needs.

For a reactor with 6 stacks with 5 electrolytic cells each, it has been found that the regeneration step takes about as long as the suspension preparation. Since the dye reduction is performed batchwise, it is much advantageous to perform the cleaning/regeneration step while a new dye suspension is prepared. This allows to retain all stacks in the reduction process until a more time-consuming maintenance is needed. A good regeneration procedure comprises cleaning/regenerating all cathodes of one stack together and all stacks subsequently with one day intervals, i.e. one stack a day. On day 7, after all cathodes have been cleaned, all anodes of one stack are cleaned, i.e. the cathodes of each stack with one week intervals, all anodes of one stack with 7 weeks intervals. While these sequences can be changed, this procedure has been proved optimal in view of productivity, leucodye loss and amount of cleaning solution needed.

For this cleaning or regeneration step, the electrochemical reactor is also provided with means for supplying cleaning solutions to the stacks of electrolytic cells or rather the electrolytic cells 4 themselves. These means comprise at least one cleaning medium supply pipe 61 for supplying cleaning/regeneration solutions to the cathode or anode and—on the side of the electrolytic cell opposite to the inlet—at least one cleaning medium removal pipe 62 for removing acidic cleaning solutions and water and preferably also a basic solution. These cleaning medium supply pipes 61 can be bypasses of a catholyte supply pipe 151 and an anolyte supply pipe 31, i.e. using the same inlets and outlets, or independent pipes with own inlets and outlets adjacent to the ones of the catholyte circulation loop 15 or the anolyte circulation loop 33. In general, the one or more cleaning medium supply pipes 61 are connected to acid vessels 63a for supplying acid, and optionally to base vessels 63b for supplying base, as well as to a water line supplying deionized water. The one or more cleaning n medium removal pipes 62 are either directly fed to a waste water treatment plant (WWTP) or to waste water vessels for storing waste water. In a preferred embodiment, the cleaning solutions are circulated for some time, i.e. until their pollution reaches an undesired level. In case of circulation, the cleaning medium removal pipe 62 is connected to a vessel 63a, 63b via cleaning medium circulation means 64. In this case it is preferred to have the cleaning medium circulation means equipped with one or more particle filters and/or adsorption filters, preferably just downstream the electrolytic cells.

Cleaning or regenerating, respectively, a particulate electrode or both electrodes in an electrochemical reactor of the present invention comprises washing the first and/or second compartments 41, 42, in particular the bed or the particulate electrode, respectively, with strong acids (pK<1) by circulating the acidic solution through the compartments 41, 42, in particular the electrode bed, followed by washing the compartment(s) 41, 42, in particular the bed with water, optionally and preferably after having washed the acid treated compartment(s) 41, 42 with a basic solution, preferably caustic soda, for more efficient acid and electrode contamination removal.

While there are shown and described presently preferred embodiments of the invention, it is to be distinctly understood that the invention is not limited thereto but may be otherwise variously embodied and practiced within the scope of the following claims.

LIST OF REFERENCE NUMBERS 1 main vessel
11a solid dye inlet
11b dye suspension inlet
12 catholyte outlet
13 reduced catholyte inlet
14 main suspension circulation loop
P03 main suspension circulation pump
141 ultrasound apparatus in main suspension circulation loop
15 catholyte circulation pipe or catholyte circulation loop
151 catholyte supply pipe
P01 catholyte supply pump
152 particle filter in catholyte supply pipe
153 catholyte heating means (heat exchanger)
154 ultrasound apparatus in catholyte supply pipe
16 leucodye outlet
2 first vessel
21a solid dye vessel
21b solid dye inlet
23 first suspension circulation loop
221 ultrasound apparatus in first suspension circulation loop
23 first suspension outlet
231 first suspension supply pipe
P05 first suspension supply pump
25 leucodye return pipe
241 leucodye inlet
25 first suspension mixer
P04 leucodye return pump
3 anolyte vessel
31 anolyte supply pipe
32 anolyte outlet
33 anolyte circulation pipe or anolyte circulation loop
331 anolyte heating means such as heat exchanger
332 adsorption filter
P02 acolyte pump 4 acolyte inlet
41 electrolytic cell with
41 first compartment or cathode compartment
411 catholyte inlet
412a reduced catholyte outlet
412b reduced catholyte return pipe
413a bypass for changing catholyte direction
413b bypass for changing catholyte direction
42 second compartment or anode compartment
421 anolyte inlet
422a anolyte outlet
422b acolyte return pipe
43 separator, semipermeable membrane
44 concentrated leucodye outlet (batchwise)
5 stack of electrolytic cells
61 cleaning medium supply pipe
62 cleaning medium removal pipe
63a acid vessel
63b base vessel
64 cleaning medium circulation means

The invention claimed is:

1. An electrolytic dye reduction method comprising:
preparing in a main vessel and/or in a first vessel a catholyte having a leucodye concentration from 5 to 20% w/v and the dye concentration is from 10 to 20% w/v by dispersing the dye in a leucodye comprising electrolyte, and
supplying the catholyte from the main vessel and/or first vessel to a cathode compartment of an electrolytic cell for reduction,
wherein said preparing includes adding the dye in a solid form to the leucodye comprising electrolyte.

2. The electrolytic dye reduction method of claim 1 wherein the dye is indigo and the leucodye is leucoindigo.

3. The electrolytic dye reduction method of claim 1 wherein the leucodye is the sole dispersing agent for the dye.

4. The electrolytic dye reduction method of claim 1, wherein concentrated leucodye solution is diluted with electrolyte and supplemented with dye, optionally circulated to improve the homogeneity of the suspension, and then forwarded to an electrolytic cell for electrolytic reduction, optionally repeating this step until the desired amount of leucodye solution with desired leucodye concentration is obtained.

5. The electrolytic dye reduction method of claim 4, wherein the catholyte is fed to the electrolytic cell via a particle filter and/or a heating means.

6. The electrolytic dye reduction method of claim 4, wherein the catholyte is circulated via the electrolytic cell until all the dye is reduced.

7. The electrolytic dye reduction method of claim 4, wherein concentrated leucodye solution is diluted with electrolyte and supplemented with dye, circulated through an ultrasound apparatus to improve the homogeneity of the suspension, and then forwarded to the electrolytic cell.

8. The electrolytic dye reduction method of claim 1, wherein a dye suspension or catholyte is at least in part prepared in the first vessel and then supplied to the main vessel.

9. The electrolytic dye reduction method of claim 1, wherein the suspension preparation in the first vessel and/or in the main vessel encompasses circulating the suspension in the first vessel and/or in the main vessel via an ultrasound apparatus and optionally a heating means.

10. The electrolytic dye reduction method of claim 1 comprising
(i) adding a first part of a dye to be reacted to a leucodye comprising basic electrolyte solution in the first vessel or in the main vessel and circulating, optionally through one or more ultrasound apparatuses to form a first catholyte,
(ii) forwarding the first catholyte of step (i), optionally via a filter for removing oversized particles and optionally a heating means, into at least one electrolytic cell and
(iii) starting the at least one electrolytic cell by stepwise enhancing the voltage to conversion voltage and maximum conversion power,
(iv) adding a further part of dye to be reacted thereby enhancing the power and continuing conversion,
(v) optionally repeating step (iv) until desired concentration of the leucodye is achieved,
(vi) converting the dye to leucodye until the power diminishes to a threshold conversion power due to dye conversion,
(vii) removing the leucodye solution.

11. The electrolytic dye reduction method of claim 10, wherein the leucodye comprising basic electrolyte solution is prepared by
(i) preparing a diluted leucodye suspension by dispersing a starting amount of dye in electrolyte and reducing it to obtain a diluted leucodye solution,
(ii) adding additional dye to the diluted leucodye solution of step (i) and reducing it to obtained a more concentrated or a concentrated leucodye solution,
(iii) optionally repeating step (ii) until the desired concentration of leucodye is obtained.

12. The electrolytic dye reduction method of claim 11, wherein the leucodye comprising basic electrolyte solution is prepared by
(i) preparing a diluted suspension of dye in basic electrolyte in the main vessel or in the first vessel and the main vessel by circulating and heating the suspension, optionally by improving the suspension by circulating it through one or more ultrasound apparatuses,
(ii) electrochemically treating the diluted suspension of step (i) in the electrolytic cells to obtain a diluted leucodye solution,
(iii) forwarding the diluted leucodye solution of step (ii) into the first vessel or the main vessel and there supplying it with further dye to obtain a leucodye comprising suspension by circulating and heating,
(iv) then circulating the leucodye comprising suspension of step (iii) through the electrolytic cells for electrolytic conversion of the dye to the leucodye or the leucodye comprising suspension to a leucodye comprising solution, respectively, optionally
(v) repeating steps (iii) and (iv) one or more times with the solution of step (iv) and further dye to form a leucodye solution in basic electrolyte.

13. The electrolytic dye reduction method of claim 10 wherein
(i) circulating is performed with heating,
(ii) the first catholyte of step (i) is forwarded via a filter for removing oversized particles and a heating means, and
(iv) the power is enhanced to maximum power.

14. An electrolytic indigo reduction method comprising preparing in a main vessel and/or in a first vessel a catholyte having a leucodye concentration from 5 to 20% w/v and the dye concentration is from 10 to 20% w/v by dispersing indigo in a leucoindigo comprising electrolyte and supplying the catholyte from the main vessel and/or first vessel to a cathode compartment of an electrolytic cell for reduction, wherein said preparing includes adding the indigo in a solid form to the leucoindigo comprising electrolyte.

15. The electrolytic indigo reduction method of claim 14, wherein leucoindigo is the sole dispersing agent for indigo.

\* \* \* \* \*